Patented Nov. 27, 1951

2,576,666

UNITED STATES PATENT OFFICE 2,576,666

PROCESS FOR PRODUCING HEPTACHLOR

Henry Bluestone and Rex Everett Lidov, Denver, James Harvey Knaus, Longmont, and Paul William Howerton, Denver, Colo., assignors to Julius Hyman & Company, Denver, Colo., a corporation of Delaware No Drawing. Application December 7, 1949, Serial No. 131,692

12 Claims. (Cl. 260—648)

This invention relates to new compositions of matter possessing unexpectedly high toxicity to insect life.

More specifically, this invention relates to a new halogenated hydrocarbon composition possessing high insecticidal activity and it also relates to the methods of producing this new composition.

One object of this invention is to produce organic materials possessing a high order of insecticidal activity.

Another object of this invention is the production of a new insecticidally active organic composition for which the ratio of insecticidal toxity to mammalian toxicity is relatively high.

A further object of this invention is to provide means for producing this insecticidally active material both easily and economically.

Other objects, features, capabilities and advantages are comprehended by the invention, as will later appear and as are inherently possessed thereby.

It has been known for some time that when the Diels-Alder addition compound resulting when one mole of hexachloro-cyclopentadiene is caused to react with one mole of cyclopentadiene (this adduct will hereinafter be identified as HCA) is chlorinated a new substance possessing a remarkable degree of insecticidal activity is formed. The substance so obtained, now known as chlordane, is a light colored viscous liquid; it was disclosed and claimed in the co-pending application of Julius Hyman, Serial Number 607,078, filed July 25, 1945, and assigned to Velsicol Corporation, now abandoned. The liquid composition obtained by the procedures described in the cited application has the empirical formula $C_{10}H_6Cl_8$. Chlordane would therefore appear to be the product obtained when one mole of chlorine is added to the aforementioned Diels-Alder adduct.

Continuing investigations of the liquid $C_{10}H_6Cl_8$ led to the significant discovery that this substance was not a single pure material but was instead a mixture of closely related compounds. These closely related compounds could be separated chromatographically and as a result there were obtained three pure crystalline compounds having the formulae $C_{10}H_5Cl_7$, $C_{10}H_6Cl_8$, and $C_{10}H_5Cl_9$ respectively. The $C_{10}H_6Cl_8$ compound thus obtained was found to be identical with a crystalline $C_{10}H_6Cl_8$ compound melting between 103° and 105° C. which is disclosed and claimed in U. S. Patent No. 2,519,190, issued to Julius Hyman on August 15, 1950, and assigned to Velsicol Corporation. This crystalline substance was found to have an insecticidal toxicity only about one-half that of the liquid material previously described.

The facts with respect to the crystalline compound $C_{10}H_6Cl_8$ are disclosed and that compound is claimed in the co-pending application of Julius Hyman, Serial Number 736,419, filed March 21, 1947, and assigned to Julius Hyman & Company (now abandoned). Since the insecticidal activity of the compound $C_{10}H_5Cl_7$ (now known as heptachlor) is approximately three and one-half to four times that of the liquid having the average composition of $C_{10}H_6Cl_8$ the much higher activity of this liquid as compared with the crystalline $C_{10}H_6Cl_8$ was adequately explained.

Since the time of the original disclosure of the hereinabove recited facts the adduct HCA has been chlorinated many times under a variety of conditions and in a variety of solvents. This procedure, when neither a deficiency nor an excess of chlorine was used, has invariably led to the normally expected product, that is, either the active liquid $C_{10}H_6Cl_8$ or the less active crystalline $C_{10}H_6Cl_8$.

More recently, Bluestone, Tajima and Lidov in a co-pending application, Serial Number 131,061, filed December 3, 1949, have disclosed that chlorination of the adduct HCA dissolved in benzene and chlorinated in the complete absence of light gives rise to a hitherto unknown isomer having the empirical formula $C_{10}H_6Cl_8$. These applicants also show that the yield of this isomer can be appreciably increased by carrying out the chlorination in the presence of finely divided carbon or by making other modifications in the chlorination process. This new $C_{10}H_6Cl_8$ isomer which has been designated b-ODD is a much more active insect toxicant than the first known crystalline $C_{10}H_6Cl_8$ isomer which now has been designated a-ODD. In this connection, it should be noted that theoretically the adduct HCA can, by the addition of two atoms of chlorine to the double bond of the cyclopenteno ring, give rise to four stereo-isomeric compounds which differ only in the relative spacial relationships of the two chlorine atoms to each other and to the remainder of the molecule of which they become a part. Of the four theoretically possible isomers thus obtainable only two have been isolated in pure form and are known to exist. As has just previously been noted they differ by a factor of approximately four in their insecticidal activity.

As might have been expected, the discovery that the crystalline compound $C_{10}H_5Cl_7$, which, when pure, melts between 95°–96° C. possessed insect toxicity three and one-half to four times as great as that of the liquid $C_{10}H_6Cl_8$ mixture led inevitably to exhaustive research in an effort to find means for simply and economically making this desirable compound. As a result, indirect methods for its preparation have become available but none of these methods have the advantage of the simplicity which would be obtained if hepta-chlor could be prepared by direct chlorination of the adduct HCA. However, until the present time all attempts to obtain the compound hepta-chlor in this fashion have failed.

In general, no modification of the chlorination scheme first disclosed by Julius Hyman in the previously cited application has resulted in a mixture with greater activity than the one disclosed by him, and in general such alternations have usually resulted in a less active mixture of chlorine derivatives of the original adduct. Moreover none of the modifications previously tried sufficiently altered the character of the primary chlorination mixture so that hepta-chlor could be obtained therefrom by feasible fractionation procedures using the technique either of distillation or crystallization.

However we have now found that when the adduct HCA is dissolved in benzene or other solvents, such, for example, as chlorobenzene, dichlorobenzene and chloroform and chlorinated in the complete absence of light but in the presence of a suspension of fuller's earth the entire character of the product is changed. Repeated tests have confirmed the fact that the chlorination mixture obtained from the adduct HCA in this fashion is at least twice as active an insect toxicant as the original $C_{10}H_6Cl_8$ mixture now known as "Chlordane." We have also discovered that from this mixture a cut can be obtained, by simple fractionation in vacuo representing approximately 25% of the total reaction mixture which solidifies and possesses insecticidal activity equal to or greater than that of hepta-chlor and from which large quantities of hepta-chlor can be isolated by simple crystallization from methanol. These facts are altogether unexpected not only in view of the results which had previously been obtained in numerous studies of the chlorination of the adduct HCA but particularly because of the wide variation of our results from those obtained by Bluestone, Tajima and Lidov in their previously cited dark chlorination of the adduct HCA in benzene solution in the presence or absence of carbon.

The empirical formula for our new chlorinated composition (which will hereinafter be called NCC) lies between $C_{10}H_6Cl_8$ and $C_{10}H_5Cl_7$, and appears to vary somewhat from batch to batch. Numerous previous studies have shown that differentiations are possible between the various $C_{10}H_6Cl_8$ isomers and between these isomers and the related compounds containing seven and nine chlorine atoms on the basis of the reactivity of the chlorine atoms. Thus, when these various compounds are treated with 0.5N potassium hydroxide in isopropyl alcohol at the reflux temperature of the solution for a period of an hour they vary in the number of gram atoms of chlorine which, under these conditions, can be removed per mole of compound treated. It is now known that under these conditions the new $b$-ODD loses only one gram atom of chlorine per mole of compound. The older $a$-ODD, on the other hand, loses, under identical conditions, 1.8 to 2 gram atoms of chlorine per mole of compound. Similarly the compound hepta-chlor loses between 3.5 and 3.7 gram atoms of chlorine per mole of compound and the crystalline compound $C_{10}H_5Cl_9$ loses, under similar circumstances, in excess of 4 gram atoms of chlorine per mole of compound treated. Similarly, studies have shown that these compounds vary in the amount of chlorine which can be removed when they are treated with the reagent silver acetate in boiling acetic acid. This reagent will remove exactly one gram atom of chlorine per mole of hepta-chlor treated; it removes no chlorine whatsoever from either of the known ODD isomers.

When our new chlorinated HCA composition is studied using the hereinabove described analytical tools it appears likely that the activity of this new composition is not solely the result of its apparently enhanced hepta-chlor content. The qualified "apparently enhanced" is necessary because at this time it is not possible to determine with certainty whether the isolation of hepta-chlor from our new chlorinated mixture is possible because of its presence in enhanced amounts or simply because the nature of the concomitant materials has now changed in such fashion as to permit hepta-chlor to be isolated and separated from them. The results so far obtained make it appear probable that the presence of fuller's earth has not only altered the relative proportions of the previously known materials present but also has led to the formation of some of the theoretically possible but hitherto unknown isomers of the substances.

The formation of our new chlorinated adduct HCA composition is but little affected by variations either in the temperature at which chlorination is conducted or by changes in the concentration of the adduct solutions used. As a result, material can be prepared with substantially equal facility at any point within the temperature range of 30–100° C. Similarly the solution of the adduct HCA which is chlorinated can be varied from one which contains the adduct in concentrations of approximately 40 per cent by weight to solutions which are much more dilute with respect thereto.

The amount of fuller's earth which should be present for optimum results is however somewhat more critical. Studies to date indicate that the amount of fuller's earth used should be not less than one-half per cent nor more than five per cent by weight of the amount of the adduct HCA present in the benzene solution and optimal results are obtained when the per cent of fuller's earth present is within the range of one to three per cent. It has also been noted that with reduced amounts of fuller's earth the quality of the product obtained increases as the chlorination rate is reduced so that for amounts of fuller's earth less than those which are optimal some compensation can be obtained by reducing the rate of chlorination. In general, we prefer to employ one per cent of fuller's earth and to chlorinate at a rate which leads to completion of the reaction within six to eight hours.

The examples which follow more specifically illustrate the methods which can be employed in preparing our new chlorinated adduct HCA composition and the procedures which can be used in order to obtain crystalline hepta-chlor.

Example I illustrates the preparation of the starting material HCA.

EXAMPLE I

To 64.5 grams of hexachlorocyclopentadiene was added 17.5 grams of cyclopentadiene and the mixture was mechanically stirred in a closed glass vessel fitted with an efficient reflux condenser and a thermometer. The reaction is exothermic and the reacting mixture was cooled when its temperature reached 100° C. After the initial exothermic reaction subsided, the reaction mixture was permitted to stand at room temperature until solidification was complete. The solid was then transferred to a suction funnel and dried by drawing air through it. There was thus obtained 79.9 grams of a white powdery solid of good quality. This material was further purified by recrystallization from methanol. The recrystallized compound was obtained as a white crystalline solid melting between about 170° and about 180° C.

Example II illustrates one method of preparing our new chlorinated HCA composition by the direct chlorination of the adduct HCA.

EXAMPLE II

A one liter three necked flask was fitted with a reflux condenser, a motor-driven stirrer, and a sintered glass inlet tube. The apparatus set-up thus obtained was then carefully covered with an opaque black paint and with black friction tape in order to prevent the entrance of all light. Particular attention was given to the edges of the tubular glass apparatus placed in the necks of the flask in order to preclude the entrance of light by transmission lengthwise through such apparatus. Into the apparatus thus prepared was placed a solution containing 200 grams of the adduct HCA dissolved in approximately 600 cc. of benzene; two grams of fuller's earth was suspended in this solution. The solution was heated to and maintained at reflux and chlorine was then introduced through the gas inlet tube at such a rate as to cause completion of the chlorination reaction in about seven hours. After the introduction of chlorine was stopped the material was withdrawn from the chlorination flask and completely stripped of the benzene solvent. The residue thus obtained was an almost colorless extremely viscous syrup. This chlorinated mixture had a total chlorine content of 67.5 per cent and contained about 4.5 per cent of unreacted adduct HCA.

Example III illustrates a similar but larger preparation. It illustrates, too, how relatively pure hepta-chlor may be isolated from the new chlorinated HCA adduct composition thus obtained.

EXAMPLE III

An apparatus set-up similar to that described in Example II above, except for the substitution of a five liter flask for the one liter flask there employed, was used for this preparation. There was placed in the light-tight flask a solution containing 1200 grams of the adduct HCA dissolved in 3.6 liters of benzene; 12 grams of fuller's earth was suspended in this solution. The solution was heated to and maintained at its boiling point and the introduction of chlorine was commenced at a rate sufficient to effect chlorination of the adduct in a seven hour period. The reaction mixture was withdrawn from the flask, the fuller's earth was separated on a filter and the solvent was removed from the chlorinated reaction product. There was thus obtained a nearly colorless viscous liquid which did not crystallize. The crude product thus obtained was subjected to rough fractionation in vacuo and the first twenty-five per cent by weight which distilled was separated; the fraction obtained in this manner solidified to give a yellow translucent mass. This crude solid was dissolved in methanol and at the boiling point of the methanolic solution treated with decolorizing charcoal and subsequently separated therefrom by filtration. The filtrate deposited white crystals which after separation on a filter and drying melted at approximately 80° C. This solid after one recrystallization from methanol melted at 92°–94° C. and a mixture thereof with an authentic sample of hepta-chlor showed no melting point depression. The total weight of pure hepta-chlor thus obtained was approximately twenty per cent of that of the crude chlorination mixture. The procedures illustrated by the preceding examples can of course be modified in many ways without unduly altering the results obtained. It should therefore be clearly understood that these examples are illustrative only and are not in any fashion to be taken as limiting the scope of our invention.

The new composition of matter, NCC, which we have discovered is highly toxic to insect life. The high degree of insecticidal toxicity which this new compound possesses is particularly unexpected in view of the fact that no previously known chlorination mixture obtained by chlorinating the adduct HCA has approached our new composition NCC in insecticidal activity. The usefulness of our new NCC is further enhanced by the fact that it is highly soluble in a wide variety of organic solvents, and can be dissolved in high concentrations in liquid aliphatic and aromatic hydrocarbons, esters, ethers, ketones and other similar solvents.

The data hereinbelow set forth illustrates a high degree of toxicity which the new compound NCC possesses. The level of insecticidal activity is denoted by a number called the toxicity index which may be defined as one-hundred times the numerical value of the fraction which is obtained when the weight of compound undergoing test required to produce a given percentage mortality is divided into the weight of material used as a standard required to produce that same mortality. In general, therefore, the higher the toxicity index the greater the insecticidal activity of the compound. A compound equal in activity to the standard employed will have a toxicity index of 100; less active compounds have indices with numerical values below 100 and more active compounds have toxicity indices above 100. In the data given below comparisons are made on the basis of the quantity of material required to produce a fifty per cent mortality.

Table I presents the results obtained when our new NCC is tested in comparison with Chlordane and a-ODD using the common housefly (*Musca domestica*) as the test insect and using the Kearn's modified small chamber test (Soap and Sanitary Chemicals, May 1948, page 133).

Table I

| Compound: | Toxicity index |
|---|---|
| 1. Chlordane (standard) | 100 |
| 2. a-ODD | 50 |
| 3. NCC of Example II | 203 |
| 4. NCC of Example III | 203 |

Examination of the data in Table I strikingly reveals the superiority of our new NCC as an insect toxicant.

Evaluation of the toxicity of the new NCC to other insect species likewise demonstrates the superior insecticidal activity of this material. Thus, using the German roach as the test insect the new NCC is found to have a toxicity index of approximately 200 when compared with Chlordane as the standard. Similarly, compared under the same conditions with Chlordane as a toxicant for the milkweed bug the new NCC is found to be approximately two to three times as effective as is Chlordane against this insect species.

Our new composition of matter, NCC, can be utilized as an insect toxicant in all the ways customary in the art. Thus it can be dissolved in the insecticide base oils normally employed (as was done to obtain the data of Table I) and the resulting solutions sprayed or otherwise employed in the usual fashion. It can also be combined with finely divided carriers to produce both wettable and non-wettable insecticidal dusts and it can be used together with emulsifying agents, with water, and with water and oil to form insecticidal emulsions. It can also be incorporated in aerosol compositions, and, in general, it can be used either as the sole insect toxicant in an insecticidal composition or in combination with other insecticides in order to obtain combination propertes and other desirable characteristics. Moreover, our new compound NCC can be incorporated in paints and other surface coatings in order to impart insecticidal characteristics to the surface finishes, it can be incorporated into waxes and wax emulsions in order that the surfaces treated with these materials may be made insecticidal, it can be incorporated into paper and into cardboard, into inks, into plasticizers, into plastic sheets, etc. in order that desirable insecticidal characteristics can be acquired either directly by these materials or by the materials with which they are used.

It will be apparent to those skilled in the art that our new NCC which we have invented will have many uses other than those already enumerated. Thus, for example, it may because of its high solubility have value as a plasticizer and as a tackifier in many types of resinous and polymer compositions. This composition is also valuable as a starting compound and as an intermediate for perfumes, medicinals, fungicides and other organic compounds useful in the arts and sciences.

Moreover, modifications of the basic concept of our invention here presented will be evident to those skilled in the art. Such modifications are properly to be included within the scope of our disclosed invention which is, in no way, to be restricted by the various illustrative data hereinbefore contained but only by the claims appended hereto.

We claim:

1. The process for making the compound heptachlor which comprises the chlorination with elemental chlorine of 4, 5, 6, 7, 8, 8-hexachloro-3a, 4, 7, 7a-tetrahydro-4, 7-methanoindene dissolved in a solvent, in the presence of fuller's earth suspended in the solution while the latter is maintained in complete darkness at a temperature between 30° and 100° C., separating the suspended fuller's earth from the solution, and removing the solvent from the chlorinated product.

2. The process for making the compound heptachlor which comprises the chlorination with elemental chlorine of 4, 5, 6, 7, 8, 8-hexachloro-3a, 4, 7, 7a-tetrahydro-4, 7-methanoindene dissolved in a solvent, in the presence of fuller's earth suspended in the solution while the latter is maintained in complete darkness at a temperature between 30° and 100° C., separating the suspended fuller's earth from the solution, removing the solvent from the chlorinated product, and separating the compound heptachlor from the product so obtained.

3. The process for making the compound heptachlor which comprises the chlorination with elemental chlorine of 4, 5, 6, 7, 8, 8-hexachloro-3a, 4, 7, 7a-tetrahydro-4, 7-methanoindene dissolved in a solvent, in the presence of fuller's earth suspended in the solution while the latter is maintained in complete darkness at a temperature between 30° and 100° C., separating the suspended fuller's earth from the solution, removing the solvent from the chlorinated product, distilling the chlorinated product, in vacuo, to separate the lower boiling portion thereof, and by fractional crystallization preparing substantially pure heptachlor from the crude heptachlor distillate so obtained.

4. A process according to claim 1, in which the solvent is selected from the group consisting of benzene, chlorobenzene, dichlorobenzene and chloroform.

5. A process according to claim 4, in which the amount of fuller's earth employed varies between about one-half percent and about five percent based on the weight of 4, 5, 6, 7, 8, 8-hexachloro-3a, 4, 7, 7a-tetrahydro-4, 7-methanoindene subjected to chlorination.

6. A process according to claim 5, in which the solvent is benzene.

7. A process according to claim 2, in which the solvent is selected from the group consisting of benzene, chlorobenzene, dischlorobenzene and chloroform.

8. A process according to claim 7, in which the amount of fuller's earth employed varies between about one-half percent and about five percent based on the weight of 4, 5, 6, 7, 8, 8-hexachloro-3a, 4, 7, 7a-tetrahydro-4, 7-methanoindene subjected to chlorination.

9. A process according to claim 8, in which the solvent is benzene.

10. A process according to claim 3, in which the solvent is selected from the group consisting of benzene, chlorobenzene, dichlorobenzene and chloroform.

11. A process according to claim 10, in which the amount of fuller's earth employed varies between about one-half percent and about five percent based on the weight of 4, 5, 6, 7, 8, 8-hexachloro-3a, 4, 7, 7a-tetrahydro-4, 7-methanoindene subjected to chlorination.

12. A process according to claim 11, in which the solvent is benzene.

HENRY BLUESTONE.
REX EVERETT LIDOV.
JAMES HARVEY KNAUS.
PAUL WILLIAM HOWERTON.

REFERENCES CITED

The following references are of record in the file of this patent:

FOREIGN PATENTS

| Number | Country | Date |
|---|---|---|
| 618,432 | Great Britain | Feb. 22, 1949 |

OTHER REFERENCES

Kearns et al.: J. Econ. Ent., vol. 42, No. 1, February 1949, pages 127–134.